US008726609B1

(12) United States Patent
Laing et al.

(10) Patent No.: US 8,726,609 B1
(45) Date of Patent: May 20, 2014

(54) MODULAR TURBINE ENCLOSURE

(71) Applicant: General Electric Company, Schenectady, NY (US)

(72) Inventors: Donald Gordon Laing, Houston, TX (US); Gerardo Plata, Queretaro (MX); Oswaldo Alberto Sanchez, Queretaro (MX); Mehdi Milani Baladi, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/676,269

(22) Filed: Nov. 14, 2012

(51) Int. Cl.

| | |
|---|---|
| ***E04H 1/00*** | (2006.01) |
| ***E04B 1/00*** | (2006.01) |
| ***F02C 7/20*** | (2006.01) |
| ***E06B 1/02*** | (2006.01) |
| *E04B 2/74* | (2006.01) |
| *F23R 3/60* | (2006.01) |
| *E04B 2/82* | (2006.01) |

(52) U.S. Cl.
CPC ........... *E06B 1/02* (2013.01); *E04B 2002/7483* (2013.01); *F23R 3/60* (2013.01); *E04B 2/825* (2013.01)
USPC ........... 52/745.15; 60/796; 52/36.1; 52/238.1

(58) Field of Classification Search
USPC ............. 52/27, 474, 475.1, 764, 768; 60/796, 60/797, 798; 181/213, 214, 218; 312/140.1, 140.3, 326, 329, 236, 312/351.1, 351.3, 351.5, 351.74, 351.8; 454/242
See application file for complete search history.

(56) References Cited

U.S. PATENT DOCUMENTS

| | | | | |
|---|---|---|---|---|
| 3,392,497 | A | 7/1968 | Cushman | |
| 3,885,362 | A | 5/1975 | Pollock | |
| 3,919,852 | A * | 11/1975 | Jones | 62/7 |
| 4,007,388 | A * | 2/1977 | Lawyer et al. | 310/51 |
| 4,487,014 | A * | 12/1984 | Vinciguerra | 60/797 |
| 5,467,747 | A * | 11/1995 | Brandt et al. | 123/198 E |
| 5,929,394 | A | 7/1999 | Westerbeke, Jr. | |
| 6,412,284 | B1 * | 7/2002 | Horner | 60/772 |
| 6,758,875 | B2 * | 7/2004 | Reid et al. | 55/385.2 |
| 6,962,057 | B2 * | 11/2005 | Kurokawa et al. | 60/796 |
| 2002/0055330 | A1 | 5/2002 | Schroeder et al. | |
| 2005/0220917 | A1 * | 10/2005 | Pierik et al. | 425/88 |
| 2007/0220895 | A1 | 9/2007 | Horner | |
| 2008/0265728 | A1 * | 10/2008 | Collins et al. | 312/326 |
| 2009/0049842 | A1 * | 2/2009 | Canham et al. | 60/796 |
| 2012/0073215 | A1 | 3/2012 | Zhang et al. | |

* cited by examiner

*Primary Examiner* — William Gilbert
*Assistant Examiner* — Kyle Walraed-Sullivan
(74) *Attorney, Agent, or Firm* — Sutherland Asbill & Brennan LLP

(57) ABSTRACT

The present application provides a modular enclosure for use with an equipment platform and a turbo-machine. The modular enclosure may include a first number of walls attached to a number of legs of the equipment platform and a second number of walls attached to the legs of the equipment platform. The first number of walls may include a number of pivotable panels. The second number of walls may include an access aperture therein. The equipment platform may provide a roof for the modular enclosure.

15 Claims, 3 Drawing Sheets

MODULAR TURBINE ENCLOSURE

TECHNICAL FIELD

The present application and the resultant patent relate generally to enclosures for gas turbine engines and the like and more particularly relate to modular, flat pack enclosures incorporated into an adjacent inlet filter system platform or other type of structure.

BACKGROUND OF THE INVENTION

Noise enclosures for gas turbine engines and other types of turbo-machinery generally should be sufficiently large so as to provide ample access for personnel to work on either side of the machinery. This desired sized, however, may exceed non-permitted transport limits such that the shipping a completed enclosure may be costly and time consuming. Moreover, building the enclosure in the field from individual components also may be costly and time consuming due to such issues as inclement weather and field labor. Specifically, constructing the enclosure in the field requires structural steel erection, field wiring, ducting, piping, and the like. Field variability in the respective components also must be accommodated and resolved. The enclosure and the components therein then must be tested and quality checked in the field.

There is thus a desire for an improved enclosure for gas turbine engines and other types of turbo-machinery. Preferably, the modular enclosure may allow for conventional low cost shipping while also providing ease of field assembly and adequate personnel access in a cost efficient design that may accommodate all related turbine components.

SUMMARY OF THE INVENTION

The present application and the resultant patent thus provide a modular enclosure for use with an equipment platform and a turbo-machine. The modular enclosure may include a first number of walls attached to a number of legs of the equipment platform and a second number of walls attached to the legs of the equipment platform. The first number of walls may include a number of pivotable panels. The second number of walls may include an access aperture therein. The equipment platform may provide a roof for the modular enclosure.

The present application and the resultant patent further provide a method of erecting a modular enclosure about a turbo-machine. The method may include the steps of transporting the walls of the modular enclosure in a flat pack configuration, positioning an equipment platform about the turbo-machine, positioning mechanical and/or electrical components about the equipment platform, attaching the walls of the modular enclosure about a number of legs of the equipment platform, and enclosing the turbo-machine.

The present application and the resultant patent further provide a gas turbine engine system. The gas turbine engine system may include a gas turbine engine, a filter house platform with a number of support legs positioned about the gas turbine engine, and a number of walls attached to the support legs such that the gas turbine engine is enclosed by the filter house platform and the walls.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
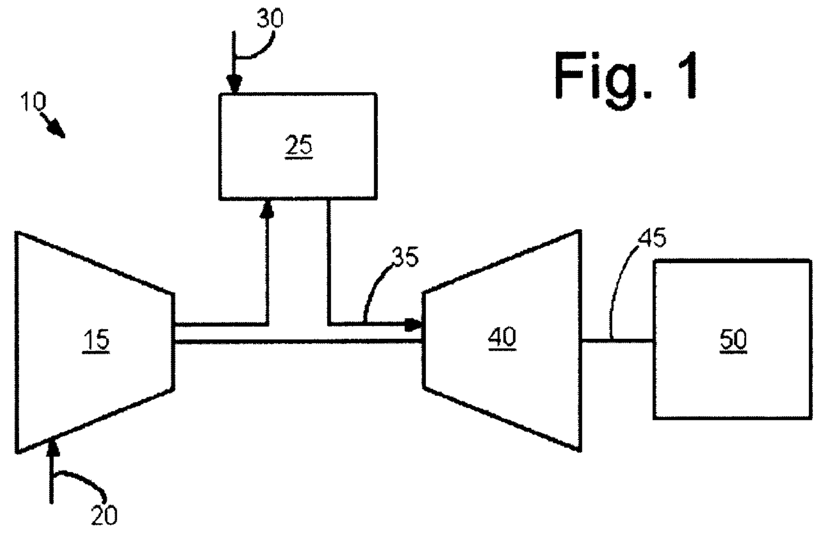
FIG. 1 is a schematic diagram of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. Moreover, multi-shaft gas turbine engines 10 and the like also may be used herein. In such a configuration, the turbine 40 may be split into a high pressure section that drives the compressor 15 and a low pressure section that drives the load 50. Other configurations may be used herein.

The gas turbine engine 10 may use natural gas, liquid fuels, various types of syngas, and/or other types of fuels. The gas turbine engine 10 may be any one of a number of different gas turbine engines offered by General Electric Company of Schenectady, N.Y., including, but not limited to, those such as the LM2500, LM6000 aero-derivative gas turbines, 7 or a 9 series heavy duty gas turbine engines, and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
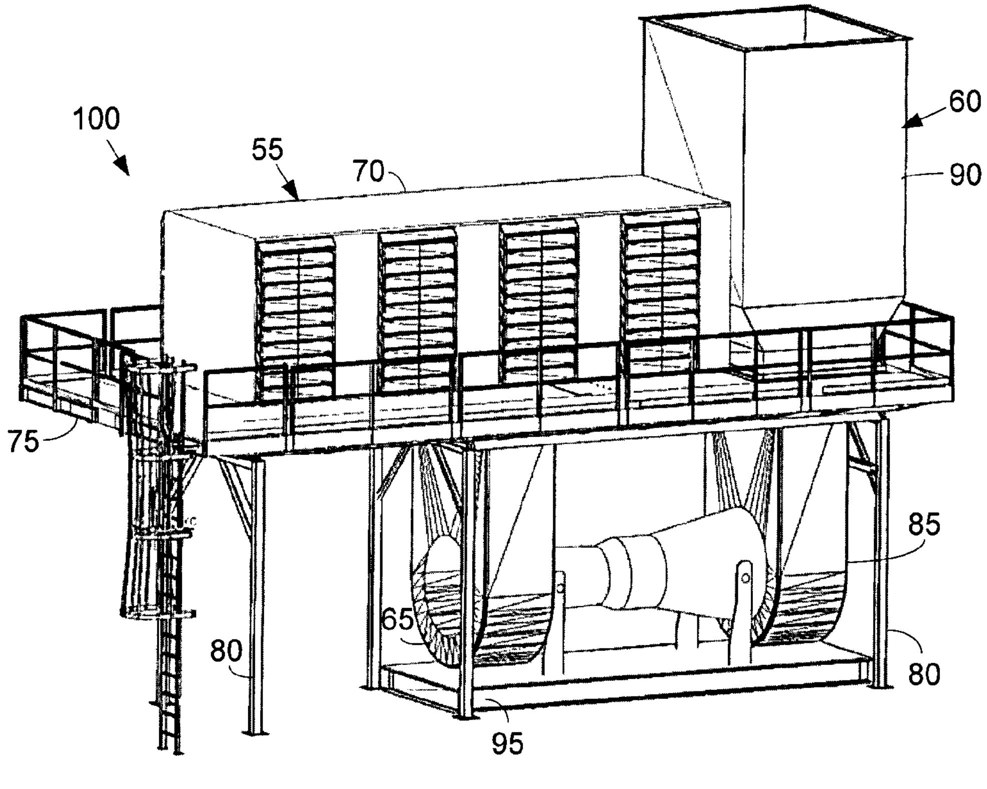
FIG. 2 is a perspective view of a gas turbine engine positioned about an inlet filter system and an exhaust system.

FIG. 2 shows the gas turbine engine 10 positioned about an inlet filter system 55 and an exhaust system 60. The inlet filter system 55 may include an inlet air plenum 65 positioned about the compressor 15. The inlet filter system 55 also may include an inlet filter house 70. The inlet filter house 70 may have a number of filters therein to filter the incoming flow of air 20. The inlet filter system 55 then may transfer the flow to the compressor 15 via the inlet air plenum 65. The inlet filter system 55 and the components thereof may have any size, shape, or configuration.

The inlet filter house 70 may be positioned about a filter house platform 75. The filter house platform 75 may extend above the gas turbine engine 10 via a number of support legs 80. Any number of support legs 80 may be used herein. The filter house platform 75 and the support legs 80 may have any size, shape, or configuration. The support legs 80 may be made out of structural steel and the like. Other locations near the gas turbine engine 10 also may be used herein.

The exhaust system 60 may include an exhaust collector 85. The exhaust collector 85 may be in communication with the turbine 40 and a flow of spent combustion gases. The exhaust collector 85 may lead to an exhaust duct 90. The exhaust duct 90 may be positioned about the filter house platform 75 or elsewhere. The exhaust duct 90 may exhaust the flow of spent combustion gases and/or provide heat exchange with other flows as appropriate. The exhaust system 60 and the components thereof may have any size, shape, or configuration. The gas turbine engine 10 may be positioned about a base 95. The base 95 may have any size, shape, or configuration. Other components and other configurations may be used herein.

Figure 3:
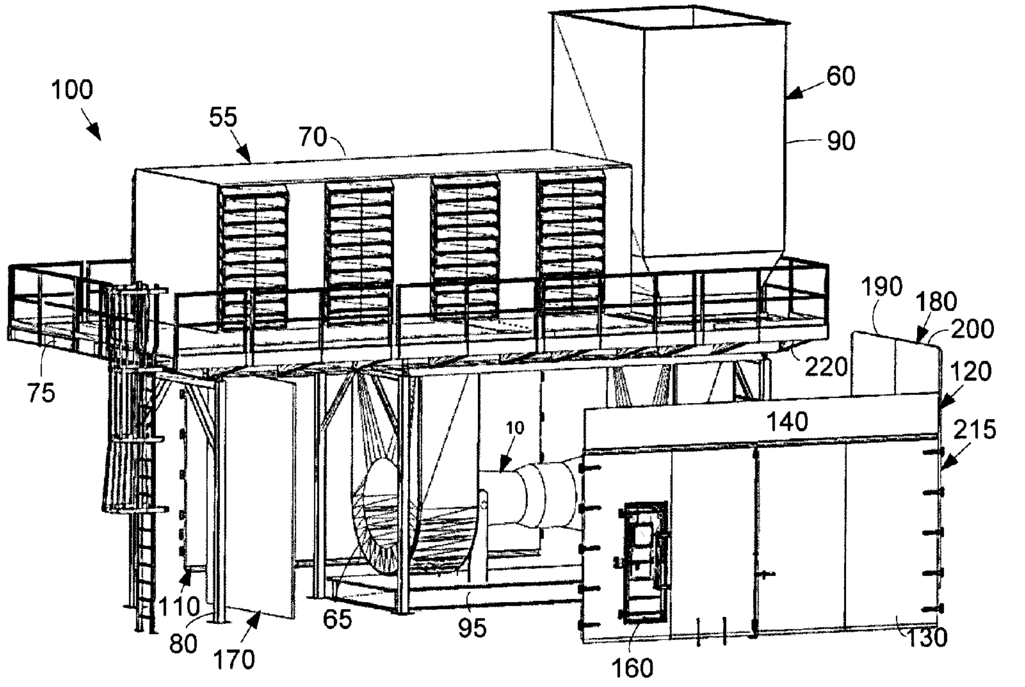
FIG. 3 is an exploded perspective view of a modular enclosure as may be described herein and positioned about the gas turbine engine of FIG. 2.

FIG. 3 shows an exploded view of a modular enclosure 100 as may be described herein and positioned about the gas turbine engine 10. The modular enclosure 100 may include a first sidewall 110 and an opposed second side wall 120. The sidewalls 110, 120 may be positioned substantially parallel to the axis of rotation of the shaft 45. The sidewalls 110, 120 may include a number of sidewall panels 130 positioned about a sidewall frame 140. The sidewall panels 130 may be attached to the frame 140 and/or to each other via a number of hinges 150 and the like. Other types of pivoting and/or attachment devices may be used herein. Any number of the sidewall panels 130 may be used herein in any size, shape, or configuration. One or more of the sidewall panels 130 may have a personnel door 160 therein. The personnel door 160 may allow personnel access into the modular enclosure 100. Other type of access may be provided herein. The sidewall panels 130 also may open about the hinges 150 or other devices so as to allow increased access during, for example, gas turbine swaps and overhauls. Panels 130 with differently sized doors and other openings may be used. Panels 130 may be used on one side or another. Moreover, specifically designed panels 130 may be shipped directly to the site to accommodate site-specific variations. Other components and other configurations may be used herein.

The modular enclosure 100 also may include a first end wall 170 and an opposed second end wall 180. The end walls 170, 180 may be positioned substantially perpendicularly to the axis of rotation of the shaft 45. The first end wall 170 may or may not have access apertures and the like therein. The second end wall 180 may have a first half 190, a second half 200, and an access aperture 210 formed therein. The access aperture 210 may be sized and configured to allow the shaft 45 (as well as a coupling and/or a coupling guard) to extend therethrough to the load 50 or other type of equipment. The end walls 170, 180 may have any size, shape, or configuration. Other components and other configurations also may be used herein.

Figure 4:
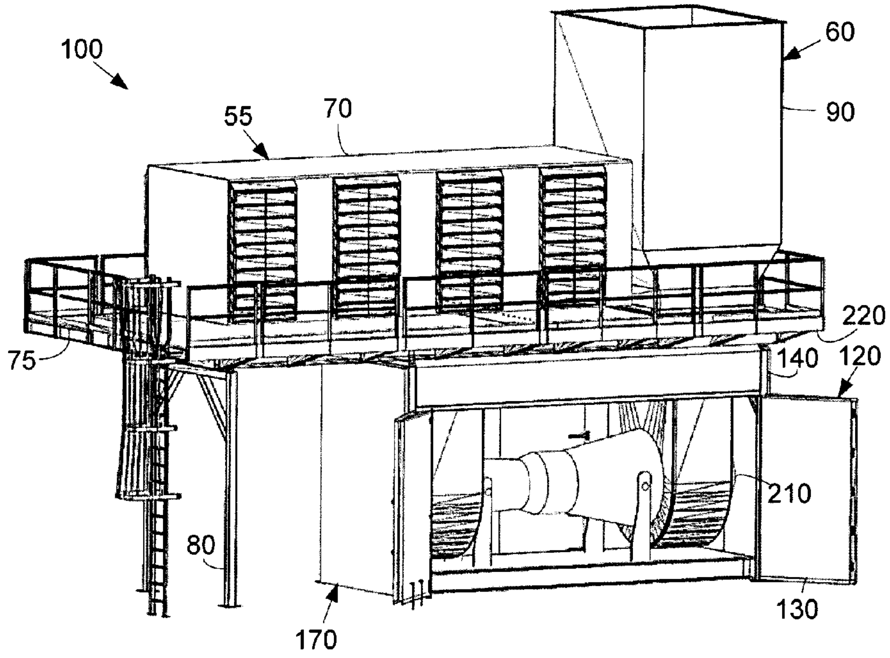
FIG. 4 is a perspective view of a partially assembled modular enclosure of FIG. 3 positioned about the gas turbine engine.
Figure 5:
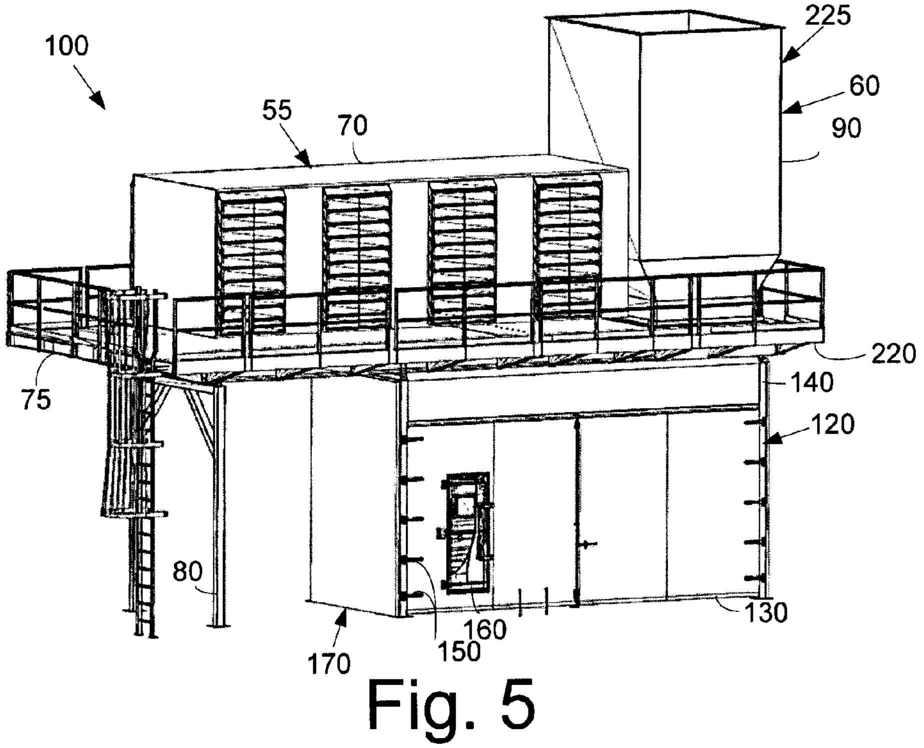
FIG. 5 is a perspective view of the modular enclosure of FIG. 3 positioned about the gas turbine engine.

As is shown in FIG. 3, the walls 110, 120, 170, 180 may be unattached when shipped and may use a flat pack shipping configuration 215. By use of the term "flat pack shipping configuration", we mean that the walls and other structure shown may lie substantially flat and stack upon each other for shipping. FIG. 4 shows the modular enclosure 100 assembled about the gas turbine engine 10 with the sidewall panels 130 on the second sidewall 120 open to allow access to the gas turbine engine 10. FIG. 5 shows the modular enclosure 100 positioned about the gas turbine engine 10 with the sidewall panels 130 closed for a completed gas turbine engine system 225. Other components and other configurations may be used herein.

In use, the sidewalls 110, 120 and the end walls 170, 180 may be transported in the flat pack shipping configuration 215 so as to conform to typical unpermitted load transport limits. The sidewall 110, 120 and the end walls 170, 180 may be assembled on site about the gas turbine engine 10. The sidewalls 110, 120 and the end walls 170, 180 may be attached to the support legs 80 of the filter housing platform 75. Given such, the filter housing platform 75 may act as a roof 220 for the modular enclosure 110. The electrical and mechanical subsystems may be mounted beneath the filter housing platform 75 and/or may be premounted on any of the walls 110, 120, 170, 180 of the modular enclosure 100 with quick disconnect electrical and/or mechanical interfaces. These systems may include, but are not limited to, enclosure fire systems and instrumentations, fire protection piping and nozzles, pressure instrumentation, temperature instrumentation, and the like. The filter house platform 75 also may include ventilation ducting, flow detectors, and damper mechanisms for the proper ventilation of the modular enclosure 100.

The walls 110, 120, 170, 180 may be attached to each other, to the support legs 80, and to the filter house platform 75 via a number of sealing mechanisms. The sealing mechanisms may provide for airtight sealing so as to enable a positive or negatively vented enclosure 100. The walls 110, 120, 170, 180 may have sound attenuating materials embedded therein so as to reduce sound pressure levels emanating from the gas turbine engine 10. The end walls 170, 180, may have a sufficient width such that the modular enclosure 100 provides ample access on either side of the gas turbine engine 10 for maintenance personnel and the like.

The modular enclosure 100 thus provides ease of access while utilizing the flat pack shipping configuration 215. Moreover, through integration of the modular enclosure 100 with the filter house platform 75 and the support legs 80 thereof, the conventional structural supports generally required for a filter house and a separate turbine enclosure may be eliminated so as to provide a more compact and optimized package design with reduced ducting. Moreover, preinstalling and/or prewiring the electrical and mechanical components may further reduce overall field work and field variability. Specifically, the electrical and mechanical components may now be installed and tested in the factory so as to reduce trouble-shooting efforts in the field. The modular enclosure 100 thus provides ample maintenance space with reduced transport, installation, and commissioning costs.

Figure 6:
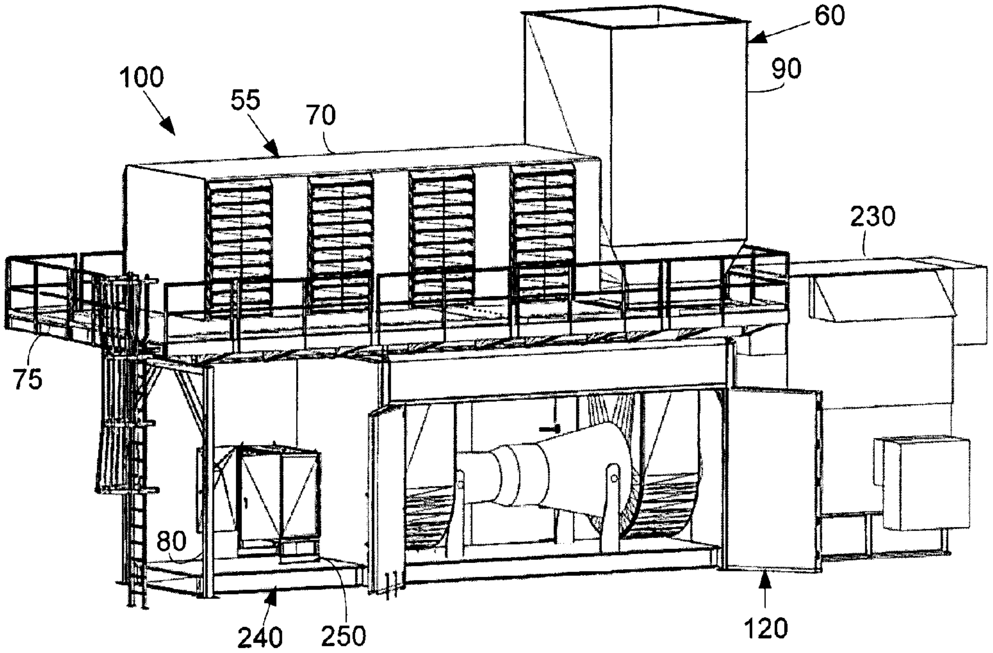
FIG. 6 is a perspective view of the modular enclosure of FIG. 3 positioned about the gas turbine engine with an equipment skid and equipment base positioned adjacent thereto.

FIG. 6 shows the use of the modular enclosure 100 with an adjacent equipment skid 230. The equipment skid 230 may have the load 50 therein that may be drive by the shaft 45. The load 50 may any type of device that may be driven by the shaft 45 and the like. The combination of the modular enclosure 100 and the equipment skid 230 thus provides a fully integrated gas turbine package driver including air filtration therein.

The modular enclosure 100 also may be used with an equipment base 240. The equipment base 240 may have equipment cabinets 250 and the like for positioning of the electrical and mechanical components therein. The equipment base 240 and the equipment cabinets 250 may be any size, shape, or configuration. The equipment base 240 may house the electrical and mechanical components thereon as opposed to or in conjunction with the filter housing platform 75 or on any of the walls 110, 120, 170, 180 of the modular enclosure 100. The mechanical and electrical equipment may be positioned within the equipment cabinets 250 and elsewhere via quick disconnect couplings and the like. Other components and other configurations also may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A modular enclosure for use with a fixed equipment platform having a plurality of legs and a turbo-machine, comprising:
- a first plurality of walls attached to the plurality of legs of the fixed equipment platform;
- the first plurality of walls comprising a plurality of pivotable panels;
- a second plurality of walls attached to the plurality of legs of the fixed equipment platform;
- the second plurality of walls comprising an access aperture therein;
- the first plurality of walls and the second plurality of walls forming the modular enclosure; and
- wherein the fixed equipment platform comprises a roof of the modular enclosure.

2. The modular enclosure of claim 1, wherein the first plurality of walls comprises a pair of sidewalls.

3. The modular enclosure of claim 1, wherein the first plurality of walls comprises a frame with the plurality of pivotable panels attached thereto.

4. The modular enclosed of claim 1, wherein the plurality of pivotable panels comprises one or more doors thereon.

5. The modular enclosure of claim 1, wherein the second plurality of walls comprises a pair of end walls.

6. The modular enclosure of claim 1, wherein the second plurality of walls comprises a first half, a second half, and the access aperture therebetween.

7. The modular enclosure of claim 1, wherein the access aperture is sized to accommodate a shaft of the turbo-machine.

8. The modular enclosure of claim 1, wherein the first plurality of walls and the second plurality of walls comprise a flat pack configuration for shipping.

9. The modular enclosure of claim 1, wherein the first plurality of walls and the second plurality of walls comprise a sound attenuating material.

10. The modular enclosure of claim 1, further comprising an equipment skid with a load thereon positioned adjacent to the first plurality of walls or the second plurality of walls.

11. The modular enclosure of claim 1, further comprising an equipment base positioned adjacent to the first plurality of walls or the second plurality of walls.

12. The modular enclosure of claim 11, wherein the equipment base comprises one or more equipment cabinets thereon.

13. The modular enclosure of claim 1, wherein the equipment platform comprises a filter house platform.

14. The modular enclosure of claim 1, further comprising an inlet air plenum and an exhaust collector positioned within the modular enclosure.

15. A method of erecting a modular enclosure for use with a fixed equipment platform having a plurality of legs and a turbo-machine, comprising:
- providing a fixed equipment platform having a plurality of legs;
- providing a turbo machine;
- providing a first plurality of walls attached to the plurality of legs of the fixed equipment platform;
- at least one wall of the first plurality of walls comprising a plurality of pivotable panels;
- providing a second plurality of walls attached to the plurality of legs of the fixed equipment platform;
- at least one wall of the second plurality of walls comprising an access aperture therein;
- each of the first plurality of walls and each of the second plurality of walls forming the modular enclosure; and
- wherein the fixed equipment platform comprises a roof of the modular enclosure.

* * * * *